INVENTORS.
Andre J. E. Roualet.
Francis W. Hamilton.
BY

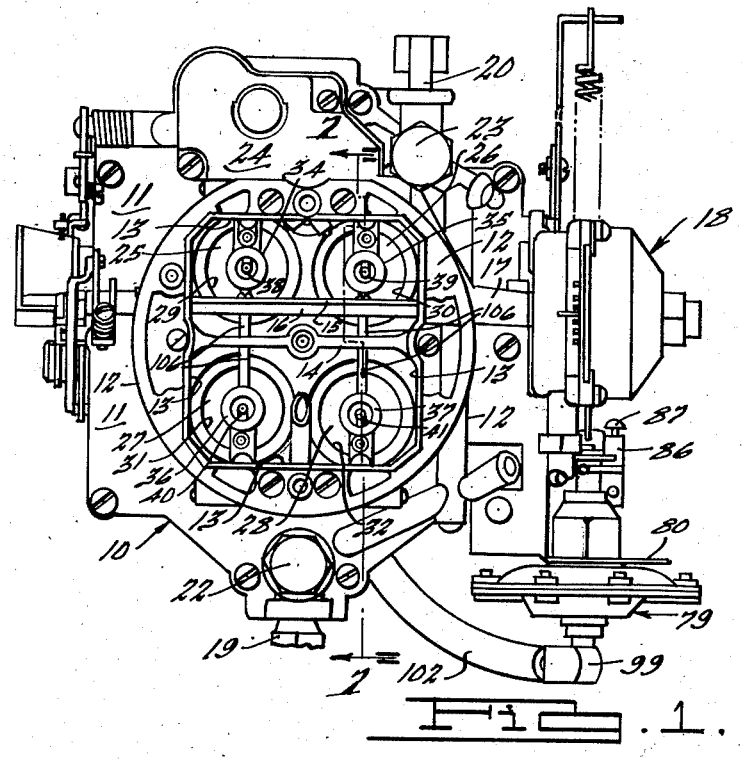

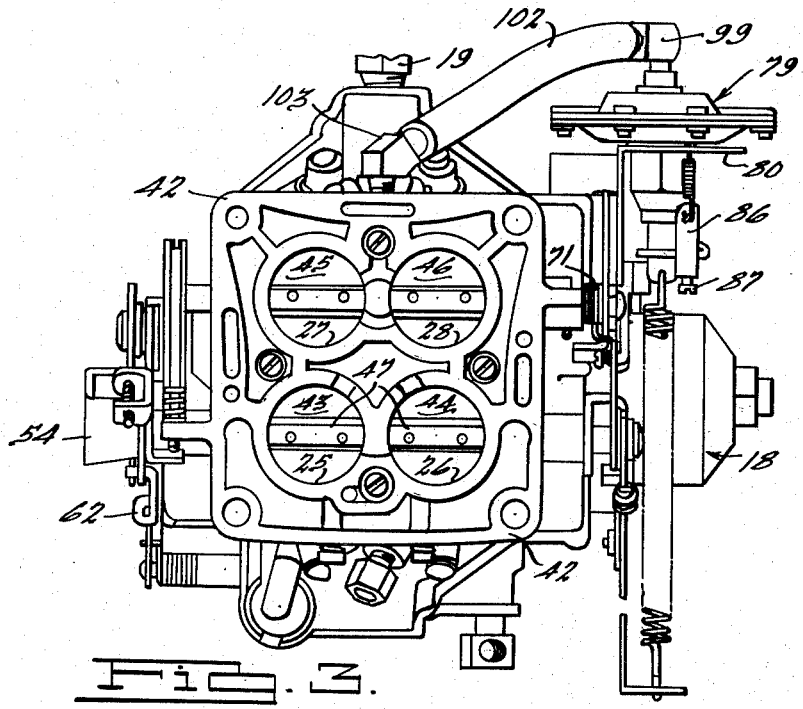

Harness and Harris
ATTORNEYS.

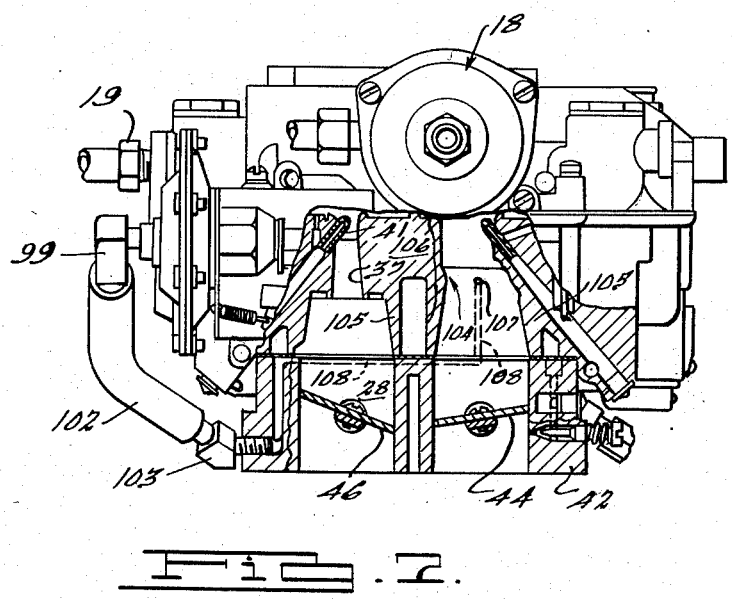

United States Patent Office 2,801,834
Patented Aug. 6, 1957

2,801,834

CARBURETOR THROTTLE VALVE CONTROL MECHANISM

Andre J. E. Roualet, Birmingham, and Francis W. Hamilton, Southfield Township, Oakland County, Mich., assignors to Chrysler Corporation, Highland Park, Mich., a corporation of Delaware Application August 20, 1953, Serial No. 375,493

6 Claims. (Cl. 261—23)

This invention relates to liquid fuel carburetors of the two-stage type and to twin liquid fuel carburetors for use on internal combustion engines. More particularly, this invention relates to a means for controlling the operation of the second stage of the two-stage carburetor or the second carburetor of a twin carburetor engine.

An internal combustion engine having a wide range of operating speeds should preferably be provided either with an engine carburetor having a second or auxiliary stage or a second or auxiliary carburetor in order to provide a sufficient intake capacity while the engine is operating under high speeds. However, when the engine is operating in the lower speed range it is necessary to render the second carburetor or the second carburetor stage inoperative in order to maintain optimum engine performance at the lower speeds.

Accordingly, a primary object of the present invention is to provide a means which is responsive to engine speed for controlling the operation of the second stage of a two-stage carburetor so that the second stage will be inoperative at lower engine speeds and operative at higher engine speeds.

A more specific object of the present invention is to provide a means which is responsive to the pressure drop at the venturi of the intake throat of the primary stage of a two-stage carburetor to automatically control the operation of the second stage of the carburetor whereby the second stage is rendered operative only at speeds above a predetermined maximum value and at a predetermined throttle position.

A broad object of the present invention is to provide a means which is responsive to engine speed to control the operation of a second auxiliary carburetor for an internal combustion engine so that the same will be rendered operative only during predetermined operating conditions.

In general, the particular embodiment of the invention herein disclosed is adapted to be used with any available type of four-barrel carburetor. The four barrels are adapted to be operated in pairs of two, each pair having a corresponding pair of throttle valves for controlling the intake manifold charge. The throttle valves of each pair are mounted upon a common shaft and are adapted to operate in tandem. An appropriate form of throttle linkage is provided for actuating a first pair of the throttle valves, which will hereinafter be referred to as the primary throttle.

The shaft upon which the primary throttle is mounted is linked to another throttle shaft which carries a second pair of the throttle valves. This second pair of throttle valves will be hereinafter referred to as the secondary throttle.

The linkage which interconnects the primary and secondary throttle shafts includes a lost motion connection therein which is effective to cause the angular displacement of the primary throttle shaft to be transmitted to the secondary throttle shaft only during the operation of the primary throttle within a predetermined range of operating positions near the wide open or full throttle setting.

One member of the linkage which interconnects the primary and secondary throttle shafts is provided with a locking means which is effective to retain that member and the integral secondary throttle shaft in a fixed position which corresponds with the fully closed position of the secondary throttle. A carburetor air flow responsive actuating device is provided for releasing the locking means when the engine speed approaches a predetermined operating range.

The air flow responsive actuating device comprises a diaphragm member which is attached to a movable actuating rod. A chamber is formed on one side of the diaphragm member which is connected by means of a suitable conduit to an orifice located in the wall of each of the venturis of the primary carburetor stage.

During high speed engine operation within a predetermined speed range with the primary throttle near the wide open position, the static pressure drop within the primary stage venturis is sufficiently great at some predetermined air flow rate to cause the diaphragm member in the actuating device to deflect thereby causing the locking means associated with the secondary throttle shaft to be released. Upon further movement of the primary throttle toward the fully opened position, the lost motion connection in the linkage interconnecting the primary and secondary throttle shafts is effective to transmit the rotary motion of the primary throttle shaft to the secondary throttle shaft thereby causing the secondary throttle valves to open.

If the primary throttle valve is opened to a setting near the wide open position while the engine is operating at speeds such that the air flow rate through the venturi is less than a predetermined value, the locking means associated with the secondary throttle shaft is effective to retain the secondary throttle in a closed position. Under these conditions, however, the continued rotation of the primary throttle shaft toward the wide open position will cause a spring means connected to the linkage elements between the primary and secondary throttle shafts to become energized. If the air flow rate subsequently reaches the above mentioned predetermined range of values upon an increase in engine speed, the locking means is released and the energized spring means is effective to "snap open" the secondary throttle valve with a quick rotary motion.

It is possible to cause the secondary throttle to assume a partly open position when the locking means is released by moving the primary throttle to a position which is intermediate the wide open position and the position at which the lost motion in the throttle interconnecting linkage is taken up.

For the purpose of more particularly describing the present embodiment of the invention, reference will be made to the accompanying drawings wherein:

Figure 1 is a top view of a four-barrel carburetor of the type which is suitable for use with the present invention;

Figure 2 is a side view of the carburetor shown in Figure 1;

Figure 3 is a bottom view of the carburetor shown in Figure 1;

Figure 4 is a side view of the carburetor of Figure 1 showing the side directly opposite from that shown in Figure 2;

Figure 7 is a sectional view taken along the section line 7—7 in Figure 1.

Figure 5:
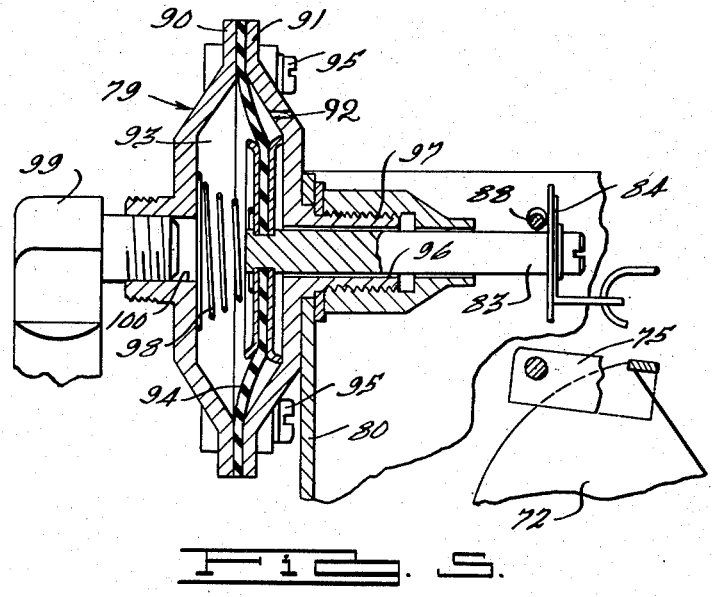
Figure 5 is a cross-sectional view of the actuating device for controlling the second carburetor stage.

Having reference first to Figure 1, the carburetor includes an upper cast housing, shown generally at 10, which has formed thereon flange portions 11 and a circular upwardly extending extension 12. The extension 12 has formed therethrough a square-shaped opening defined by the vertical walls 13. A partition wall 14 is extended across the center of the square opening thus defining a double air intake passage.

A choke valve 15 is mounted upon a shaft 16 which extends across the square opening on one side of the partition wall 13. The choke valve, as seen in Figure 1, is in the fully opened position. When in the fully closed position, the choke valve completely covers the square intake opening on one side of the partition wall 13.

The shaft 16 is suitably mounted within a portion of the housing 10 shown at 17 and extends into a thermostatic actuating device shown generally at 18.

A pair of fuel inlet fittings are provided at 19 and 20 through which fuel is admitted to a float chamber, not shown. Suitable filter means are removably mounted in the inlet fuel passage beneath the fittings shown at 22 and 23.

The cast housing 10 has situated therein an accelerator pumping mechanism and metering jets under the removable cover shown at 24.

Each of the four carburetor barrels is visible in Figure 1 and are designated by means of numerals 25, 26, 27, and 28 respectively. The pair of barrels 25 and 26 is associated with the primary stage of the carburetor and the pair of barrels 27 and 28 is associated with the secondary or auxiliary stage. Each of the barrels 25, 26, 27, and 28 includes a narrow venturi or throat portion shown respectively at 29, 30, 31, and 32.

A small venturi is concentrically mounted on the upstream side of each of the venturis 25, 26, 27, and 28. These small venturis are shown at 34, 35, 36, and 37 and have secured therein the individual main fuel distributor nozzles 38, 39, 40, and 41 respectively.

Having reference next to Figure 3, the bottom view of the four barrels is shown with a throttle valve mounted in each barrel. These throttle valves are designated in Figure 3 by means of numerals 43, 44, 45, and 46. The bottom portions of these barrels are formed in a mounting casting shown generally by numeral 42. The pair of valves 43 and 44 constitute the primary throttle and the pair of valves 45 and 46 constitute the secondary throttle.

Each pair of valves is mounted upon a separate throttle shaft. The primary throttle shaft is designated by means of numeral 47 and is extended through the casting 42 to a throttle actuating linkage on the right side of the carburetor as viewed in Figure 3. This linkage will subsequently be described in particular detail.

With reference to Figure 4, the choke valve shaft 16 is shown extended through the housing casting portion 12. Shaft 16 has secured thereon an angularly adjustable link member 48 which is interconnected with another link element 49 by element 50. The link element 49 is rotatably mounted upon the casting 42. An element 52 and the element 49 are coaxially mounted on the casting 42 and are rotatable with respect to the casting and to each other. A lost motion connection between elements 49 and 52 is provided at 53. A suitable spring means may be provided for resiliently urging the lost motion connection to the engaged and operative position. When the choke valve shaft is rotated by the thermostatic control device 18 toward the closed position, the elements 48 and 50 are effective to transmit a counterclockwise motion to the elements 49 and 52.

The primary throttle shaft 47 is extended outwardly from casting 42 and has connected integrally therewith a link element 54 which in turn has an abutment portion 55 formed thereon.

When the primary throttle is rotated to the open position, the element 52 rotates in a clockwise direction. If the primary throttle is rotated to the wide open position while the choke valve is closed, the element 52 will be contacted at the extended portion 56 thereby causing the choke valve 15 to be opened slightly.

The element 54 carries thereon an adjustable stop member 51 and the element 52 carries a cam surface 58 on one side thereof. When the primary throttle is moved toward a fully closed position while the choke valve 15 is in the closed position, the stop member 51 abuts against the cam surface which is positioned in proximate relationship with respect to the stop member 52 under these conditions. The primary throttle is thereby "cracked open" to provide for a fast idle when the engine operating temperatures are low and the choke valve is closed.

An actuator shaft for the accelerator pumping mechanism is shown at 59 and is positively connected to the element 54 by means of link members 61 and 62.

The control mechanism for the secondary throttle may best be described with reference to Figures 2, 5, and 6. The throttle valve shaft for the secondary throttle is designated in Figures 2 and 6 by means of numeral 63. The primary throttle shaft 47 is secured to the link element 64 on one side of the casting 42. An element 65 is mounted upon the outer side of casting 42 co-axially with respect to the element 64. Each of the elements 64 and 65 have abutting portions formed thereon at 66 to form a lost motion connection therebetween. A tension spring 67 is interposed between the elements 64 and 65 to normally maintain the lost motion connection at 66 in an engaged condition.

Another link element 68 is rotatably mounted on the casting 42 and is freely movable with respect to the shaft 47. A shoulder 69, which is best seen in Figure 6, is formed on the element 68 and is adapted to engage an abutment portion 70 formed on the element 65 when the element 65 is rotated about the axis of shaft 47.

A suitable throttle linkage, not shown, may be used to interconnect the element 54 with the usual type of vehicle accelerator pedal. The angular position of the throttle shaft 47 and the integral link element 64 is therefore under the control of the vehicle operator.

The secondary throttle shaft 63 is directly linked to the element 68 through the elements 72 and 73. The element 72 has formed thereon an abutment or shoulder 74 which is adapted to engage a mating abutment on a pivoted member 75 when the secondary throttle valve is in the closed position. When the secondary throttle is in a fully open or partly open position, the abutting portion of member 75 is adapted to slidably engage a circular edge 76 formed on the element 72. The secondary throttle shaft 63 and the integral element 72 may be rotated clockwise, as viewed in Figures 2 and 6, until an abutment portion 77 contacts a shoulder 78 formed on the bottom of the casting 42.

A vacuum responsive actuating device 79, which will subsequently be described more completely with reference to Figure 5, is secured to a mounting plate 80 which in turn is secured to the flange portion 11 of the casting 10 by means of suitable bolts 82, as shown in Figure 2. This actuating device includes a transversely movable shaft 83 upon which a trigger actuating member 84 is secured. The plate 80 comprises a suitable sheet steel bracket portion extending transversely across the side of the carburetor as viewed in Figure 2 and another portion formed perpendicularly to the bracket portion upon which the device 79 is secured.

Figure 6:
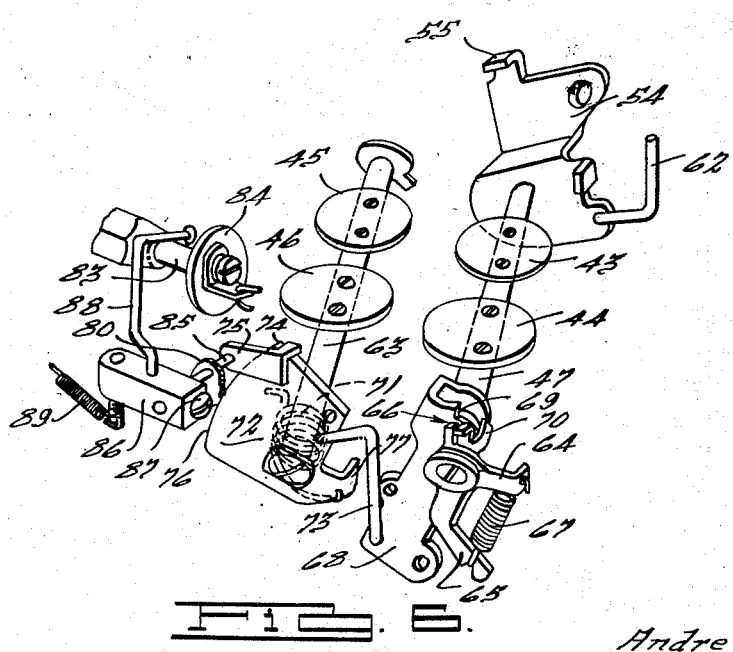
Figure 6 is a space view of the essential linkage components associated with the present invention.

The member 75 is mounted at one end thereof upon a shaft 85 formed integrally therewith which in turn is pivotally carried by the mounting plate 80, a portion of which is seen in Figure 6. The other end of shaft 85 carries a member 86 which is secured thereto by means of an adjustable set screw 87. The member 86 carries a vertically extending element 88 which terminates at a location which is in close proximity to the trigger actuating member 84. A clockwise turning moment is exerted upon the assembly consisting of member 75, shaft 85, member 86 and element 88 by means of a spring 89 which resiliently interconnects a depending portion of the member 86 and the fixed mounting plate 80.

With reference to Figure 5, the vacuum responsive actuating device is shown in detail and it comprises a pair of juxtaposed housing portions 90 and 91 which define an interior cavity 93 within which a flexible diaphragm member 94 is mounted. The housing portions 90 and 91 are effective to retain the diaphragm member 94 about its outer periphery and may be assembled together by means of screws 95. The movable shaft 83 is secured at one end thereof to the diaphragm member 94 in any convenient manner and is adapted to be loosely slidable in an aperture 96 formed in a protruding extension 97 of the housing portion 91.

A spring 98 is interposed between the housing portion 90 and diaphragm member 94 and is effective to urge the shaft 96 in an outward direction. A vent is provided in the housing portion 91 at 92.

A fitting 99 is received within an aperture 100 which is centrally formed in the housing portion 90. Fitting 99 provides a suitable connection for the vacuum pressure conduit 102 which in turn extends to another fitting 103 in the side of casting 42.

Figure 7 shows a cross-sectional view through one of the pair of primary carburetor barrels 26, and one of the pair of secondary carburetor barrels 28. Each of the four carburetor barrels includes a main venturi portion similar to that which is generally designated by numeral 104 in Figure 7. The venturis are formed in a casting 105 situated between the upper casting 10 and the lower casting 42. As previously pointed out in connection with the description of the elements shown in Figure 1, a small venturi 37 is centrally disposed within the barrel 28. This small venturi is positioned and mounted by means of a web 106 which is integrally cast to the casting 105 and terminates in a wall structure formed with the casting 105 directly beneath the partition wall 14 shown in Figure 1. Similar webs are formed above each of the three other barrels for the purpose of retaining the associated venturis 34, 35 and 36. These webs have also been designated by numeral 106 in Figure 1.

An aperture 107 is located in the wall of the main venturis in each of the barrels 25 and 26 associated with the primary stage. Suitable porting 108 is provided for establishing a communication between the fitting 103 in the casting 42, shown in Figure 2, and the aperture 107. This porting is shown diagrammatically by means of dotted lines in Figure 7. Any other suitable passage means may be provided for establishing a continuous channel between the fitting 103 and the aperture 107.

The operation of the disclosed embodiment of the present invention is as follows:

The link element 54 is actuated in the conventional manner by means of a throttle linkage which is positively linked to a vehicle accelerator pedal. As viewed in Figure 6, a counterclockwise rotation of the element 54 will cause the primary throttle valves 43 and 44 to move toward the open throttle position. The rotation of the primary throttle shaft 47 will cause a corresponding rotation of element 64 which in turn will cause a counterclockwise rotation of the element 65 by virtue of the resilient connection between these elements provided by the spring 67. Continued rotation of the shaft 47 and the element 64 will cause the abutment portion 70 on the element 65 to engage the shoulder 69 on the element 68. If it is assumed that the secondary throttle valves are in the closed position, as shown in Figure 6, the continued rotation of the primary throttle shaft 47 will cause the spring 67 to become elongated by virtue of the disengagement of the lost motion connection at 66. The spring force which formerly was effective to maintain the lost motion connection 66 in the engaged position is now effective to urge the member 70 against the shoulder 69.

Counterclockwise rotation of the member 68 under the influence of the spring pressure provided by spring 67 is prevented by the element 73 which is linked to element 72 secured to the shaft 63.

The secondary throttle shaft 63 is maintained in a closed position by virtue of the mating engagement of the abutment on member 75 and the shoulder 74 on element 72. The member 75 and the shoulder constitute a locking means for controlling the actuation of the secondary throttle valves.

The primary throttle position at which the abutment portion 70 and the shoulder 69 contact each other may be adjusted so that engagement therebetween occurs only when the primary throttle valve approaches a predetermined setting near the wide open throttle position. When the engine speed approaches a certain predetermined speed range while the primary throttle is at a position in excess of the predetermined setting, the pressure drop across the venturis 104 in the primary barrels is transmitted through the aperture 107 in the primary venturis and the porting 108 to the conduit 102. The chamber 93 within the actuating device 79 is in direct communication with the conduit 102 through the aperture 100. The device 79 is calibrated so that the diaphragm member 94 will be moved to the left, as seen in Figure 5, when the engine is operating within the predetermined range of operating speeds. Movement of the diaphragm member 94 is accompanied by a transverse shifting of the shaft 83 and the stop member 84. The element 88 carried by member 86 is contacted by stop member 84 thereby causing the element 75 to rotate in a counterclockwise direction against the pressure of the spring 89. This counterclockwise rotation of the member 75 causes the abutment member associated therewith to disengage the shoulder 74 on the element 72. At this instant the element 68 is no longer restrained from counterclockwise rotation and it therefore begins to rotate about the axis of the shaft 47 under the influence of spring 67. The rotary motion of the element 68 is transmitted to the secondary throttle shaft 63 through the elements 73 and 72 thereby causing the secondary throttle valve 45 and 46 to assume an open position.

When the primary throttle valves are again moved toward a closed position, the mating engagement between the abutment 70 and the shoulder 69 is released. Consequently the secondary throttle valves are no longer urged toward an open position by the spring 67. A coil spring 71 is provided, as shown in Figure 6, for the purpose of urging the element 72 in a counterclockwise direction and is effective to return the linked elements 72, 73 and 68 to the original position of Figure 6 thereby closing the secondary throttle valves 45 and 46.

If the engine is operating at speeds within the predetermined speed range, previously referred to, while the primary throttle position is less than the predetermined setting, the locking means at 74 and 75 is released and the spring 71 thereafter assumes the function of maintaining the secondary throttle in a closed position. When the primary throttle position approaches the predetermined setting, the abutment 70 engages the shoulder 69. Further rotation of the primary throttle shaft will thereafter cause a corresponding rotation of the secondary throttle valves toward the open position.

It is thus seen that the present invention is effective to control the operation of the secondary throttle valves so that the secondary stage of the carburetor is operative only during high speed engine operation within a predetermined speed range when such operation coincides with a throttle setting which is greater than a predetermined setting. The engine speed signal is provided by the static pressure drop within the primary venturis.

While one specific embodiment of the invention has been disclosed, it is understood that the invention is not limited thereto since many variations may readily become apparent to those skilled in the art, and the invention is to be given its broadest possible interpretation within the scope of the following claims.

We claim:

1. In a two-stage liquid fuel carburetor for use on an internal combustion engine, a venturi air intake throat, a primary throttle valve means mounted in proximate relationship with respect to said venturi throat for controlling the rate of flow of gases therethrough, a second throat, a secondary throttle valve means mounted within said second throat, means for controlling the operation of said secondary throttle valve in response to static pressure drop within said venturi throat whereby said secondary throttle valve means is effective to open said second throat during the operation of said engine at speeds above a predetermined maximum value, linkage means interconnecting said primary and secondary throttle valve means for maintaining said secondary throttle valve means in a fixed throat closing position during the operation of said engine at all speeds while said primary throttle setting is less than a predetermined maximum setting, said linkage means comprising linkage portions having a lost motion connection therebetween, locking means for normally securing said secondary throttle valve means in a closed position, said means for controlling the operation of said secondary throttle valve comprising a flexible diaphragm, an actuator rod secured to said diaphragm, an orifice formed within said venturi throat, and conduit means interconnecting one side of said diaphragm and said orifice, said actuator rod being adapted to release said locking means upon movement of said diaphragm in response to static pressure drop within said venturi throat.

2. A two-stage liquid fuel carburetor as set forth in claim 1 wherein said portions of said linkage means include a spring means resiliently interconnecting said linkage portions, said lost motion connection being in operative engagement and said spring means being stressed at primary throttle settings greater than said predetermined setting.

3. In an internal combustion engine having an intake manifold, a primary conduit and a secondary conduit for supplying a combustible mixture of fuel and air to said manifold, a primary valve and a secondary valve mounted within said primary conduit and said secondary conduit respectively, throttle linkage means for adjusting said primary valve throughout a range of operating positions, other linkage means interconnecting said primary and secondary valves, means for locking said secondary valve in a closed throttle position, said other linkage means including a spring mechanism connected to said primary valve and a first link element pivotally mounted adjacent said spring mechanism, said spring mechanism and said first link elements including cooperating portions forming a lost motion connection therebetween, said first link element being positively connected to said secondary valve, said spring mechanism being adapted to bias said first link element and said secondary valve toward an open throttle position upon movement of said primary valve beyond a predetermined maximum setting, said locking means adapted to be released in response to a predetermined pressure drop in said primary conduit to accommodate movement of said secondary valve, the latter responding to movement of said primary valve beyond said maximum setting when said locking means is released.

4. In an internal combustion engine having an intake manifold, a primary conduit and a secondary conduit for supplying a combustible mixture of fuel and air to said manifold, a primary throttle valve and a secondary throttle valve mounted within said primary conduit and said secondary conduit respectively, linkage means interconnecting said primary and secondary throttle valves including portions defining a lost motion connection, said lost motion connection including spring means for resiliently urging said secondary throttle valve toward an open throttle position upon movement of said primary valve to throttle positions greater than a predetermined setting, a locking means for maintaining said secondary throttle valve in a closed throttle position during movement of said primary throttle valve to any throttle position, a pressure responsive actuator having portions connected to said locking means, and conduit structure providing communication between said pressure responsive actuator and said primary conduit, said actuator being adapted to release said locking means when the static pressure drop within said primary conduit exceeds a predetermined maximum value to permit an adjustment of said secondary throttle valve.

5. In an internal combustion engine having an intake manifold, a primary conduit and a secondary conduit for supplying a combustible mixture of fuel and air to said manifold, a primary valve and a secondary valve mounted within said primary conduit and said secondary conduit respectively, throttle linkage means for adjusting said primary valve throughout a range of operating positions, other linkage means interconnecting said primary and secondary valves, pressure actuated locking means for locking said secondary valve in closed position and responsive to a predetermined low pressure in said primary conduit to release said secondary valve for movement from the closed position, said other linkage means including first portions connected with said throttle linkage to be actuated thereby and second portions connected with said secondary valve to actuate the same, said first and second portions having a lost motion connection therebetween effective to move said second portions and secondary valve from closed position upon predetermined movement of said first portions and primary valve from closed position when said secondary valve is released from said locking means, the connection between said portions also including resilient means yieldable upon movement of said primary valve in excess of said predetermined movement when said secondary valve is locked in closed position by said locking means.

6. In an internal combustion engine having an intake manifold, a primary conduit and a secondary conduit for supplying a combustible mixture of fuel and air to said manifold, a primary throttle valve and a secondary throttle valve mounted within said primary conduit and said secondary conduit respectively, pressure actuated locking means for locking said secondary valve in closed position and responsive to a predetermined low pressure in said primary conduit to release said secondary valve for movement from the closed position, linkage means interconnecting said primary and secondary throttle valves including resilient portions for resiliently urging said secondary throttle valve toward an open throttle position upon movement of said primary valve to throttle positions greater than a predetermined setting when said secondary valve is released from said locking means, said resilient portions being yieldable upon movement of said primary valve beyond said setting when said secondary valve is locked in closed position by said locking means.

References Cited in the file of this patent

UNITED STATES PATENTS

| 2,193,533 | Kishline et al. | Mar. 12, 1940 |
| 2,313,258 | Olson | Mar. 9, 1943 |
| 2,376,732 | Strebinger | May 22, 1945 |
| 2,640,472 | Bicknell | June 2, 1953 |
| 2,647,502 | Braum | Aug. 4, 1953 |